United States Patent

Gibson

[15] 3,697,689

[45] Oct. 10, 1972

[54] FINE TIMING RECOVERY SYSTEM

[72] Inventor: Earl D. Gibson, Hunting Beach, Calif.

[73] Assignee: North American Rockwell Corporation

[22] Filed: Dec. 23, 1970

[21] Appl. No.: 100,990

[52] U.S. Cl. ..........178/69.5 R

[51] Int. Cl. ..........H04l 7/00

[58] Field of Search ........178/69.5 R, 69; 179/15 BS; 325/42

[56] References Cited

UNITED STATES PATENTS

| | | | |
|---|---|---|---|
| 3,581,207 | 5/1971 | Chang | 325/42 |
| 3,585,298 | 6/1971 | Liberman | 178/69.5 R |
| 3,024,417 | 3/1962 | Secresan | 178/69.5 R |
| 3,292,110 | 12/1966 | Becker et al. | 178/69 |
| 3,341,658 | 9/1967 | Kaneko | 178/69.5 R |
| 3,488,440 | 1/1970 | Logan et al. | 178/69.5 R |
| 3,493,679 | 2/1970 | Chomicki | 178/69.5 R |

*Primary Examiner*—Richard Murray
*Attorney*—L. Lee Humphries, H. Fredrick Hamann and Edward Dugas

[57] ABSTRACT

The present receiver timing system utilizes the difference signal between two tap gain adjustments of an automatic adaptive equalizer as a timing control signal. A stable clock and frequency divider chain in the receiver generate a train of timing pulses. The timing control signal derived from the equalizer taps drives and ADD-DELETE circuit, which is placed in the frequency divided chain, to lock the generated timing pulse train to the received signal.

17 Claims, 14 Drawing Figures

INVENTOR
EARL D. GIBSON
BY Edward Dugas
ATTORNEY

INVENTOR
EARL D. GIBSON
BY Edward Dugas
ATTORNEY

INVENTOR
EARL D. GIBSON
BY Edward Dugas
ATTORNEY

INVENTOR
EARL D. GIBSON
BY Edward Dugas
ATTORNEY

INVENTOR
EARL D. GIBSON
BY Edward Dugas
ATTORNEY

INVENTOR
EARL D. GIBSON
BY
Edward Dugas
ATTORNEY

SAMPLE OF A TYPICAL SYSTEM PULSE (OR SINGLE-DIGIT) RESPONCE WITH SAMPLE TIMING ERRONEUSLY DELAYED

MAIN CORRECTION APPLIED BY EQUALIZER TAP $g_{-1}$

MAIN CORRECTION APPLIED BY EQUALIZER TAP $g_1$

INVENTOR
EARL D. GIBSON
BY Edward Dugas
ATTORNEY

FINE TIMING RECOVERY SYSTEM

BACKGROUND OF THE INVENTION

The present invention relates generally to timing recovery devices and more particularly to a fine timing recovery system for use in high speed synchronous data transmission systems.

In the past, various techniques utilizing phase-locked-loops have been used to synchronize the receiver baud timing, in phase and frequency, with the baud timing of the received signal. Heretofore, such systems have required the transmission of some type of signal, in addition to the information signals, to be used by the phase-locked-loops to recover the baud timing. Some prior art systems have used pilot tones which are added to the transmitted signal and which are detected in the receiver to give the timing signals which in turn are used to synchronize samplers, decision devices and/or related devices contained in the receiver. For those systems which utilize a pilot tone, the signal energy available for information is decreased due to the allocation of a portion of this energy to the pilot tone generation. The conventional systems which employ phase-locked-loops in which the input signal includes noise or extraneous signals as well as the desired signal, operate by applying to a multiplier or phase detector the received tone signal as well as the output of a continuously variable voltage controlled oscillator. The multiplier or phase detector yields an output signal which is proportional to the phase error or which is some function of the phase error. This phase error signal is generally low pass filtered to eliminate all components other than a D-C component. The D-C component is then amplified and fed to the voltage controlled oscillator to control its frequency. Another approach to timing recovery is based upon zero-crossings of the received baseband signal. However, this approach is unsuitable for use with various desirable types of signaling, such as the methods of partial response, because the received baseband signal often strays near zero throughout substantial time intervals so that small noise or intersymbol interference can cause erroneous zero-crossing indications, which in turn cause erroneous timing or damaging fluctuations in the timing.

In a co-pending U.S. Pat. application, Ser. No. 89,968, filed Nov. 16, 1970, bearing assignee's docket No. 70E79, entitled "Coarse Initial Timing Recovery Circuit," there is disclosed a recovery circuit which is comprised of a threshold crossing detector which provides an output signal each time the received signal passes through one of several preselected amplitude levels. An EARLY/LATE detector compares an output baud timing pulse train against the output signal from the threshold crossing detector and provides a first signal when the output signal is late and a second signal when the output signal is early. A pulse train generating means provides a train of pulses occuring at substantially an integer multiple of the baud timing rate to the pulse ADD/DELETE circuit. The ADD/DELETE circuit, in response to the first or second signal adds or deletes a pulse from the provided pulse train to synchronize the pulse train to an integer multiple of the correct baud timing. A frequency divider chain following the ADD/DELETE circuit divides the pulse repetition rate down to the required baud rate, maintaining the proper phase of the frequency divider output pulse train. The system provides a coarse initial timing recovery and is not usable for those applications which require a fine timing.

The present invention directs its attention towards systems which require a fine timing recovery circuit.

SUMMARY OF THE INVENTION

In one embodiment of the invention, for use with a pulsed data receiver of the type having a transversal equalizer with multiple tap gains with the tap gains positioned on either side of a tap corresponding to the major amplitude signal tap gain, the improvement comprises a comparator for comparing the signals from at least two taps located on either side of the main tap circuit, with the comparator providing an output signal indicative of the difference between the two signals. A stable clock means is used to provide a pulse train which is substantially greater in frequency than the required baud timing rate of the transmitted and received signal. The output from the stable clock means is fed to a first frequency divider, which divider divides the pulse train down to a frequency which is still greater than the baud frequency rate but less than the frequency rate of the stable clock means. The output of the frequency divider chain is fed to an ADD/DELETE circuit which circuit adds a pulse to the pulse train when the sign of the signal from the comparator is of one polarity and deletes a pulse from the pulse train when the sign of the signal from the comparator is of an opposite polarity. The output pulse train from the ADD/DELETE circuit is fed to a second frequency divider which frequency divider divides the pulse train down to the baud frequency rate which frequency rate coincides with the timing pulses used for transmitting the data signal.

In a second embodiment of the invention the first frequency divider is eliminated and the pulse train from the stable clock is fed directly to the ADD/DELETE circuit with the frequency divider means following the ADD/DELETE circuit dividing the corrected pulse train down to the required baud timing rate.

In a third embodiment of the invention, symmetrical pairs of transversal equalizer tap gains are differenced together with the difference signals being summed together to provide a control signal. The control signal is then fed to a threshold level detector which level detector provides one of three possible output signals at any one point in time. One signal is provided when the threshold signal is above a predetermined threshold level. Another signal is provided when the threshold signal is below a lower threshold and a third signal is provided when the threshold signal is between the upper and lower threshold levels. A stable clock provides a pulse train which pulse train is frequency divided to a frequency which is greater than the baud timing frequency by a first frequency divider means with the output of the first frequency divider means fed to an adjustable frequency divider which adjustable frequency divider is capable of three levels of frequency division: a central level designated $n$ and an $n+1$ level, along with an $n-1$ level, where 1 is equivalent to a single pulse. The adjustable frequency divider nominally divides by the $n$ factor which $n$ factor is selected such that the output from the adjustable frequency divider is still greater than the required baud timing rate. A third frequency divider receives the output pulse train from the adjustable frequency divider and finally divides the pulse train rate down to the desired baud timing rate.

In summary, when the baud timing is approximately correct, the control signal level from the summation device falls between the two set threshold levels and the threshold detector generates an output which causes the adjustable frequency divider to divide the frequency by a factor n. When the baud timing is late, the control signal falls below the threshold of the lower level and the threshold detector generates an output which causes the adjustable frequency divider to divide by factor $n-1$, thereby advancing the output baud timing. When the baud timing is early, the level of the control signal exceeds the upper threshold level; and the threshold detector generates an output which causes the adjustable frequency divider to divide the pulse train frequency by $n+1$, thereby delaying the output baud timing.

It is, therefore, an object of the present invention to provide a fine, precise timing recovery system for use with digital data transmission systems.

Accordingly, it is another object of the present invention to provide a timing recovery device which may be utilized with received signals containing strong intersymbol interference and still provide timing exceptionally free of jitter or fluctuations.

It is another object of the present invention to provide a fine timing recovery device which is simple in operation and which is not susceptible to drift errors.

These and additional objects will become more apparent when taken in conjunction with the following description and drawings in which like characters indicate like parts.

DESCRIPTION OF THE PREFERRED EMBODIMENTS

Figure 1:
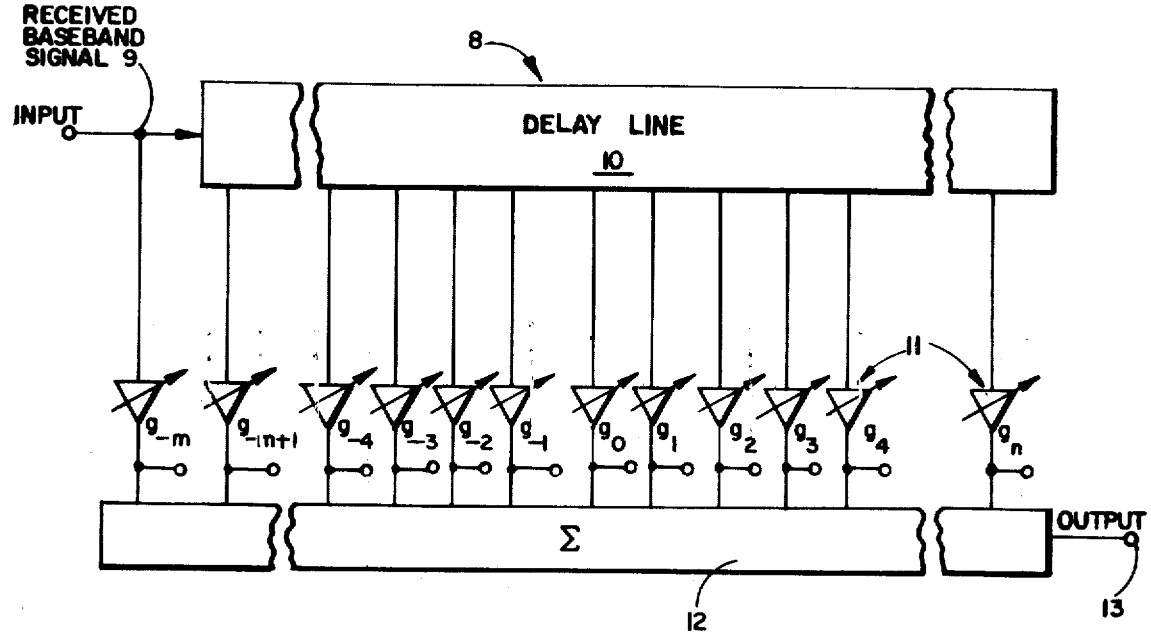
FIG. 1 illustrates a typical transversal equalizer to be used with the present invention.

Referring to FIG. 1 wherein a transversal equalizer 8 receives a baseband signal 9, having a baud transmission rate, the baseband signal is fed to a plurally tapped delay line 10. Adjustable gain amplifiers 11 (attenuators) are connected to respective individual taps of the delay line. The outputs of each of the amplifiers 11 (labeled with a *g*-subscript notation) are fed to a summation means 12. The output from the summation means 12 appearing at terminal 13 is the equalizer output.

As is well known in the prior art, the transversal equalizer operates to equalize a signal received over a distorting channel by adjusting the tap attenuators to reduce the intersymbol interference components to minimum values at sampling times.

Figure 3:
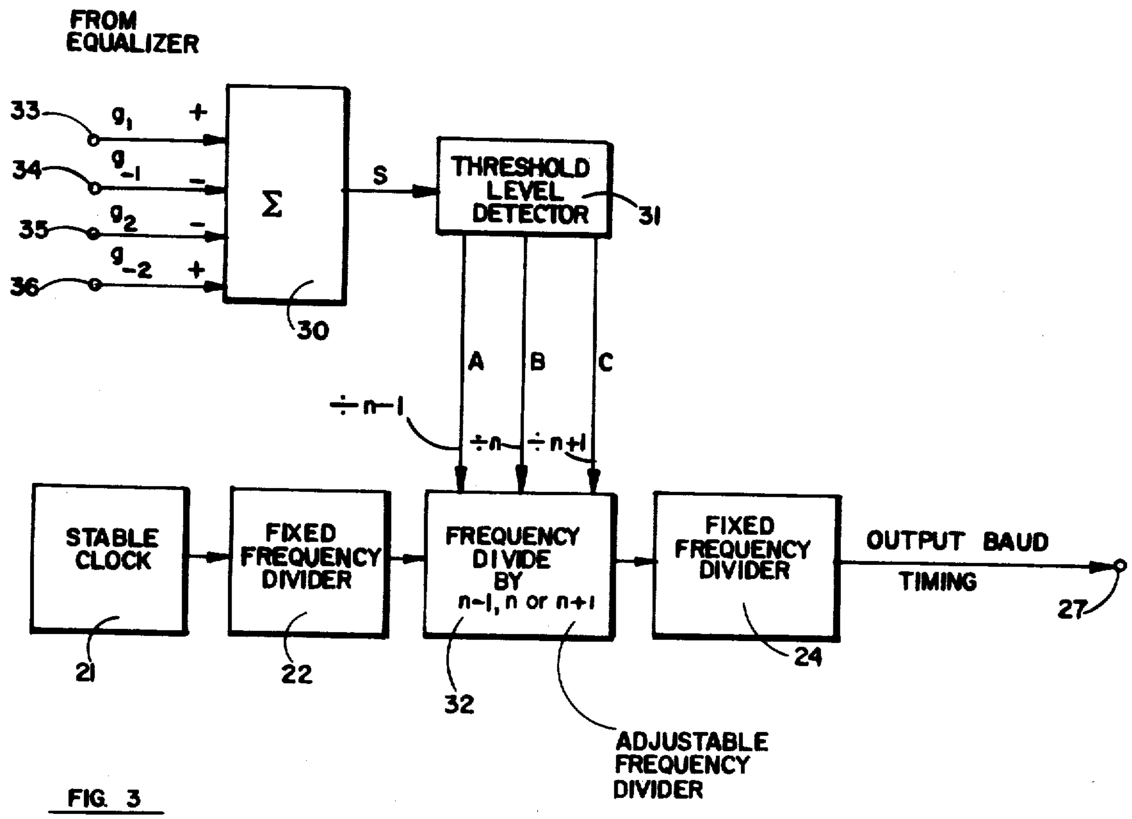
FIG. 3 illustrates a second embodiment of the invention.

A prior art transversal equalizer is disclosed in U.S. Pat. No. 3,508,153, entitled "Automatic Equalizer for Partial-Response Data Transmission Systems," by A. M. Gerrish et al. In FIG. 3 of that patent, there is shown an equalizer of the type which will operate with applicant's fine timing recovery system. Another prior art equalizer which can be used with the present timing system is disclosed in U.S. Pat. No. 3,414,819, entitled "Digital Adaptive Equalizer System," by R. W. Lucky. Still another patent showing a compatable equalizer is U.S. Pat. No. 3,368,168, entitled "Adaptive Equalizer for Digital Transmission Systems Having Means to Correlate Present Error Components with Past, Present and Future Received Data Bits," by R. W. Lucky. With each one of these prior art patents, applicant's inputs would be taken from the outputs of the adjustable attenuators in a fashion to be described.

Figure 2:
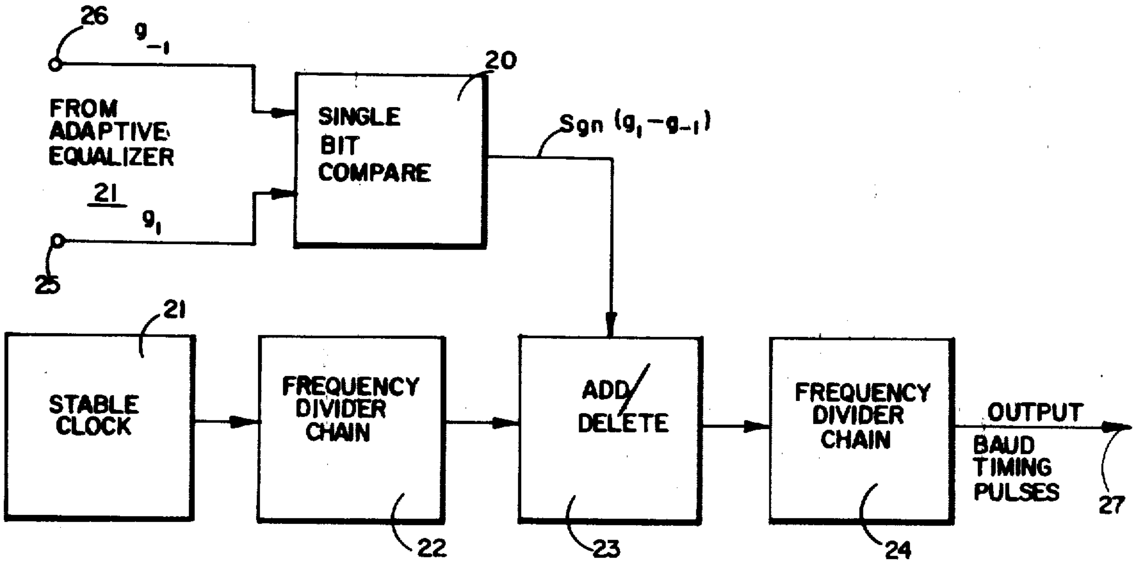
FIG. 2 illustrates one preferred embodiment of the invention.

Referring now to FIG. 2, a stable clock 21 generates a train of narrow pulses at a pulse rate which is higher than the baud rate of the data transmission (typically about 1,000 – 10,000 times higher than the baud rate). Frequency divider chain 22 receives this train of narrow pulses and divides the frequency of the pulse train to a lower rate which rate is still greater than the baud transmission rate. In some applications it may be desirable to delete frequency divider chain 22 and in such applications the last frequency divider 24 can be used to divide the frequency from the stable clock down to the baud transmission rate. An ADD/DELETE means 23 receives the output pulse train from frequency divider chain 22 and adds or deletes a pulse to the train in accordance with the command signal from the comparator means 20. In the arrangement shown in FIG. 2 the pulse adding or deleting is performed once each baud time. Alternately, the adding or deleting could be performed once every *n* baud times, when *n* is an integer between 1 and 1,000, by using a timing signal taken from an intermediate point in frequency divider chain 24 to control a gate (not shown) which would gate the control signal from the single bit compare circuit 20 into the ADD/DELETE circuit 23. The comparator means 20, in the embodiment shown, is attached to receive signals proportional to gain settings of the adjustable amplifiers 11 which gain settings are labeled $g_{-1}$ and $g_1$ in FIG. 1. These are the amplifiers positioned on either side of the main impulse amplifier labeled $g_0$. In an adaptive equalizer, the gains (or attenuations) $g_{-1}$ and $g_1$ are continually adjusted to be proportional to control signals generated within the equalizer. These control signals can be used directly to represent the tap gain settings $g_{-1}$ and $g_1$. Instead of using the tap gains, the signals at the outputs of the amplifiers (or multipliers) could also be used, but this would result in more jitter on the timing because of the pseudo-randomness of the data, unless extremely tiny increments of the timing were used. The comparator 20 compares the sign of the difference between the signals $g_1$ and $g_{-1}$, that is, $\text{sgn}(g_1 - g_{-1})$ and provides a signal indicative of the sign to the ADD/DELETE means 23. It will be shown that early baud timing causes the quantity $g_1 - g_{-1}$ to go positive whereas late baud timing causes the quantity $g_1 - g_{-1}$ to go negative. When the signal from the comparator is positive, it causes the ADD/DELETE means to delete one pulse from the pulse train, thereby retarding the baud timing. When the signal from the comparator is negative, it causes the ADD/DELETE circuit to add one pulse to the timing pulse train thereby advancing the baud timing. The output from the ADD/DELETE circuit is fed to a second frequency divider chain 24 which frequency divider chain divides the pulse train frequency down to the desired baud transmission rate. The output of the frequency divider 24 is the output baud timing pulses which pulses are available for use in the receiver at terminal 27. A receiver generally uses the timing pulses to operate samplers, demodulators and other circuits requiring exact timing.

Referring now to FIG. 3 which shows a variation of the timing recovery implementation, a summation means 30 receives the gain settings from the equalizer amplifiers (or multipliers) labeled $g_1$, $g_{-1}$, $g_2$ and $g_{-2}$ at input terminals 33, 34, 35 and 36, respectively. Inputs $g_{-1}$ and $g_2$ are subtracted from inputs $g_1$ and $g_{-2}$. The output signal from the summation means is labeled S and is fed to a threshold level detector 31. The threshold level detector is capable of delivering one of three possible output signals, either A, B or C.

Figure 4:
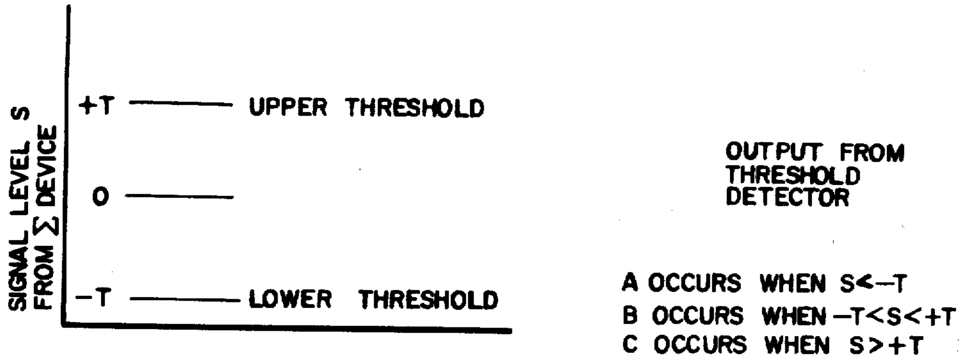
FIG. 4 illustrates the threshold levels useful in understanding the operation of the embodiment of FIG. 3.

Referring momentarily to FIG. 4, in which is shown the threshold levels of the threshold level detector 31, we can see from the chart and from the legend index that when the signal S is less than −T, which is the amplitude of the lower threshold, a signal A is transmitted by the threshold level detector 31. A signal B occurs when the signal S falls between the upper threshold level +T and the lower threshold level −T and the signal C occurs when S is greater than the upper threshold level +T.

Now, referring back to FIG. 3, the three output level signals A, B and C are fed to a frequency divider which essentially has three divide states:

$n-1$ (which occurs upon receipt of an A signal)

divide by $n$ (which occurs upon receipt of B signal) and divide by $n+1$ (which occurs upon receipt of a C signal. In practice, the adjustable frequency divider can be a counter that counts $n-1$, n or $n+1$ input pulses, before generating an output pulse. In this manner the input signal received from frequency divider 22 or, in some applications, directly from the stable clock 21 is frequency divided by $n-1$, n or $n+1$ upon command of either the A, B or C signal, respectively. The output of the adjustable frequency divider 32 is then fed to the fixed frequency divider 24, the output of which, at terminal 27, is the output baud timing rate.

When the baud timing is approximately correct, the signal S from the summation device falls between the two threshold levels and the threshold detector will then generate the output B which causes the adjustable frequency divider to divide the frequency by n. When the baud timing is late, the signal S falls below the lower threshold −T and the threshold detector generates the output B, which in turn causes the adjustable frequency divider to divide by $n-1$, thereby advancing the output baud timing. When the signal S is early, the level of the signal S exceeds the upper threshold level +T and the threshold detector generates the output signal C, which causes the adjustable frequency divider to divide the pulse train frequency by $n+1$, thereby delaying the output baud timing signal.

The following are typical numerical values used in the fine timing corrector shown in FIG. 3 for a very high performance data receiver:

- Clock Frequency = 9.6 megahertz
- First frequency divider eliminated.
- Frequency division ratio of second divider = 250
- Settings of the threshold detectors:
  - Upper level at $g_1 - g_{-1} = 0.001\ g_0$
  - Lower level at $g_1 - g_{-1} = 0.001\ g_0$
- Frequency division ratio n used nominally in the adjustable frequency divider = 8
- Baud rate = 4,800 bauds per second.

Figure 5:
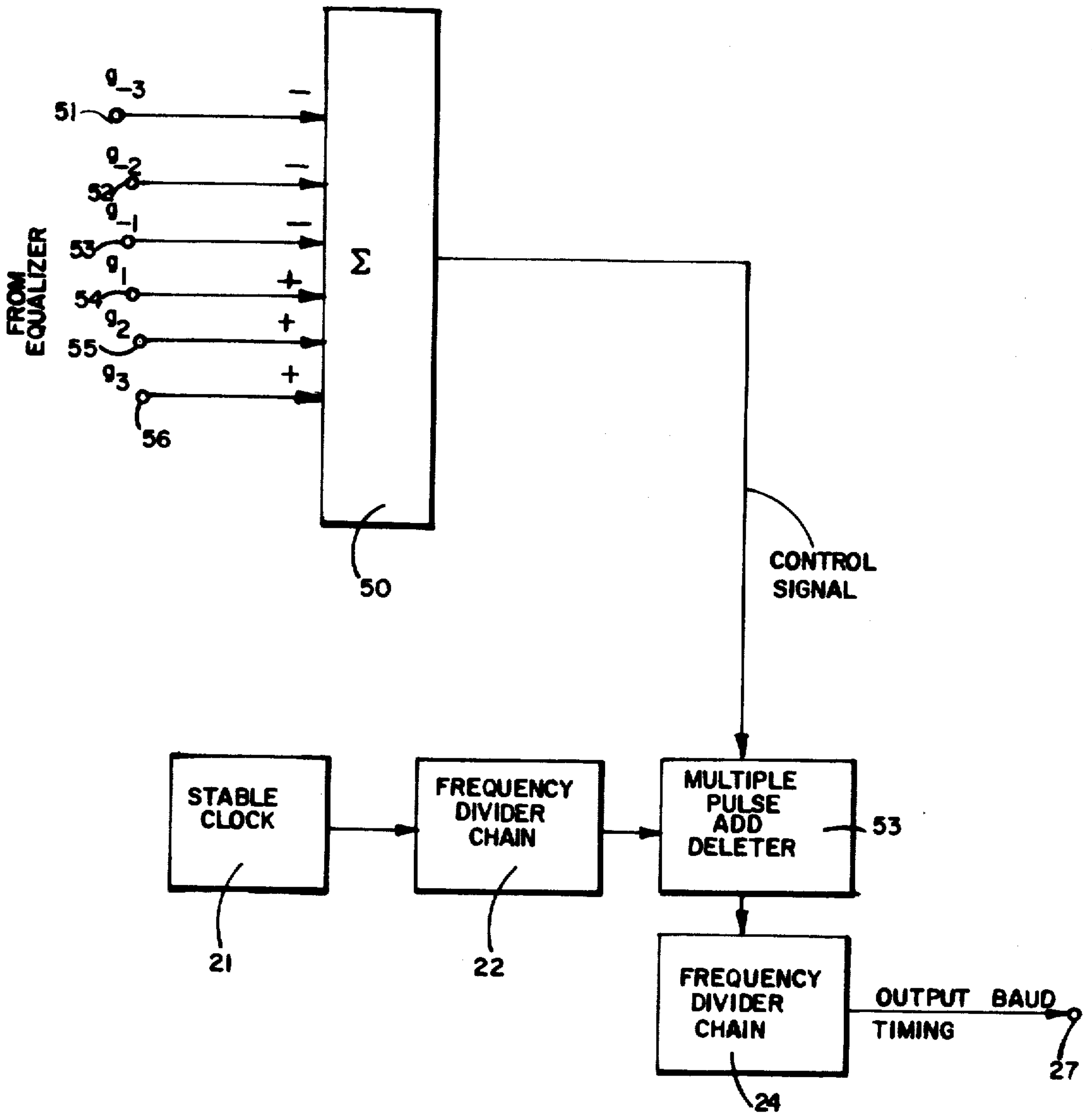
FIG. 5 illustrates a fourth embodiment of the invention which embodiment provides proportional adjustment of phase digitally.

Referring now to the embodiment disclosed in FIG. 5, the summation device 50 subtracts the odd signals $g_{-1} + g_{-2} + g_{-3} + \ldots$ from the odd signals $g_1 + g_2 + g_3 + \ldots$ which signals are proportional to the tap attenuators of the equalizer of FIG. 1. The output from the summation means is then a control signal equal to this difference. This signal is now fed to a multiple pulse ADD/DELETE means 53. The input to the multiple pulse ADD/DELETE means is derived from the frequency divider chain 22 which in turn receives its input from the stable clock 21 or, as previously suggested, in some applications, it may be desirable to receive the input to the multiple pulse ADD/DELETE directly from the stable clock 21. The multiple pulse ADD/DELETE means adds or deletes a number of pulses which number corresponds and is proportional to the magnitude and sign direction of the control signal from the summing means 50. The phase shift of the timing pulse train which shift results from the multiple pulse ADD/DELETE means 53 is therefore proportional to the control signal. The output from means 53 is then fed to the second frequency divider chain 24, the output of which is the desired baud timing signal which appears at terminal 27.

Figure 6:
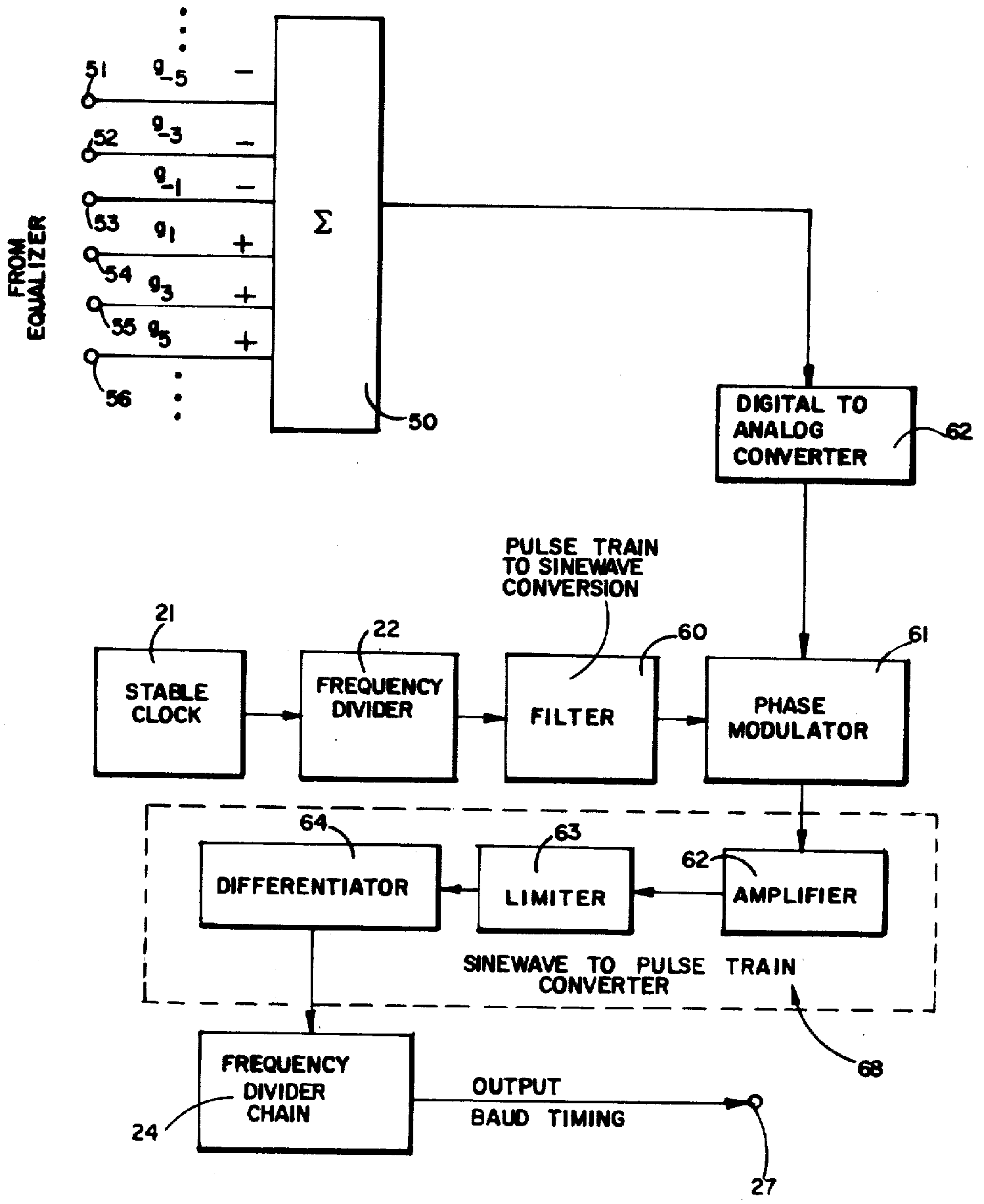
FIG. 6 illustrates a fifth embodiment of the invention which utilizes analog proportional phase shifting.

Another embodiment of the present invention is disclosed in FIG. 6 wherein the summation device 50 receives the signals $(g_1 + g_3 + g_5 + g_7 + \ldots) - (g_{-1} + g_{-3} + g_{-5} + g_{-7} + \ldots)$. The signal from the summation means which is equal to the difference of the received quantities is then fed to a digital-to-analog converter 62 which converter converts the input difference signal to an analog control signal that is proportional to the difference. The signal from the digital-to-analog converter is then fed to the phase modulator 61 which modulator receives the pulse train either from the stable clock directly, as previously mentioned, or from the frequency divider 22 after the pulse train has been converted to a sine wave by the filter means 60. The phase of the received sine wave is then modulated in phase as a function of the signal received from the converter 62 with the modulated signal being sent to a sine wave to pulse train converter 68. The pulse train converter converts the sine wave into a proportional pulse train signal which signal is fed to the frequency divider chain 24, the output of which is the desired baud timing signal which is fed to terminal 27. The sine wave to pulse train converter 68 is comprised of an amplifier 62 which amplifies the signal from the phase modulator 61, which amplified signal is then fed to a limiter 63 which chops the amplified signal to form a proportional square wave signal. The square wave signal is then fed to the differentiator 64 which differentiates the square wave signal into corresponding pulse signals with the output of the differentiator being fed to the frequency divider chain 24.

Figure 7:
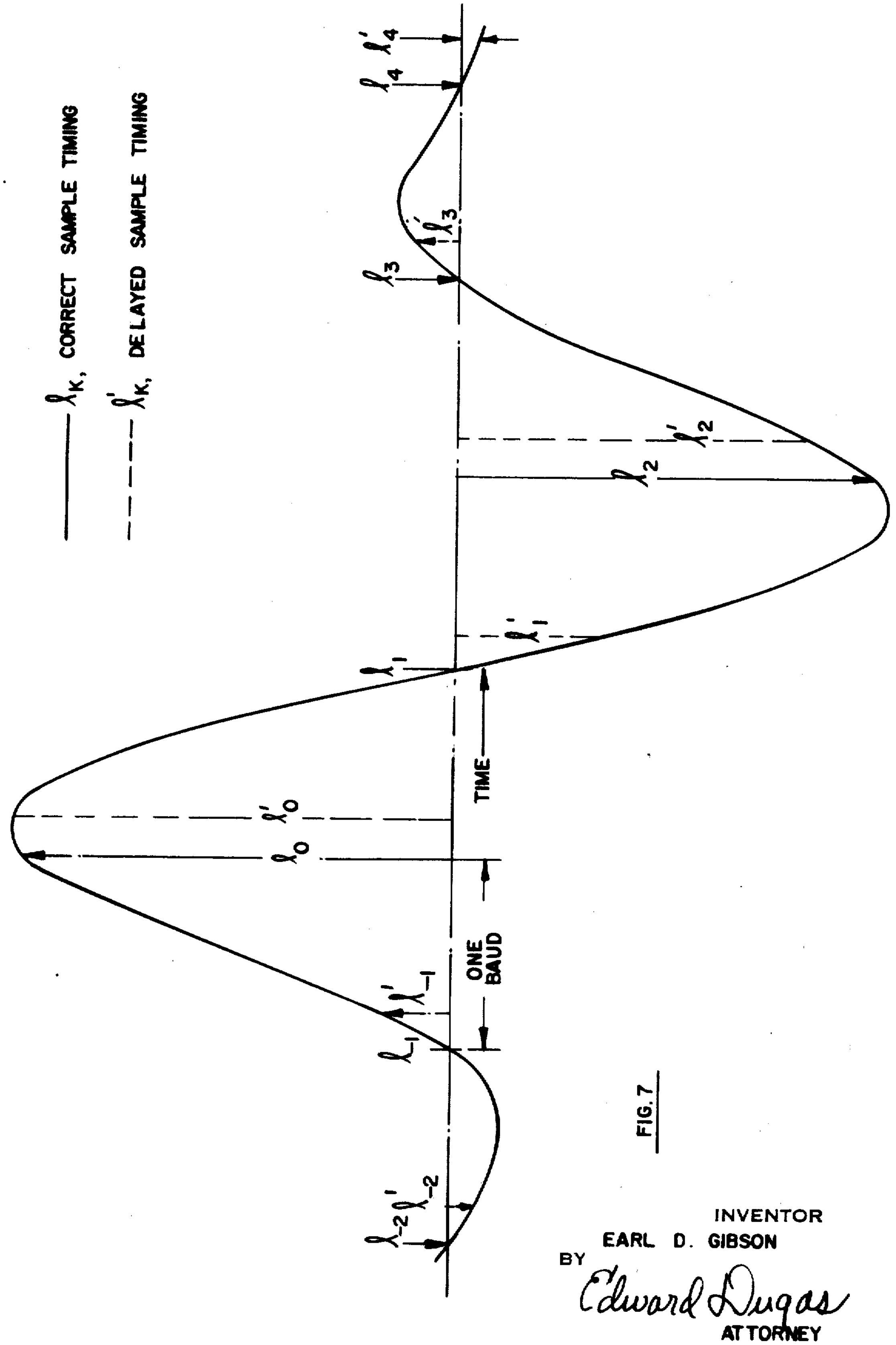
FIG. 7 is an ideal pulse response for single-sideband partial response signalling with correct and delayed sampling shown.

A signal explanation of how the preferred embodiments operate in terms of system pulse for single sideband partial response signaling will be described in the following figures:

FIG. 7 shows the system pulse response with accurate equalization and optimum carrier phase. Also, FIG. 7 shows the ideal sample timing in solid lines and a delayed sample timing in dashed lines. With the ideal sample timing $l_2 = l_o$ and all other $l$'s equal zero, where the $l$'s are the pulse response amplitude samples as labeled on FIG. 7. As can be seen, the main effect of the delayed sample timing is to cause $l_{-1}$ and $l_3$ to go positive with $l_1$ goes negative.

Figure 8A:
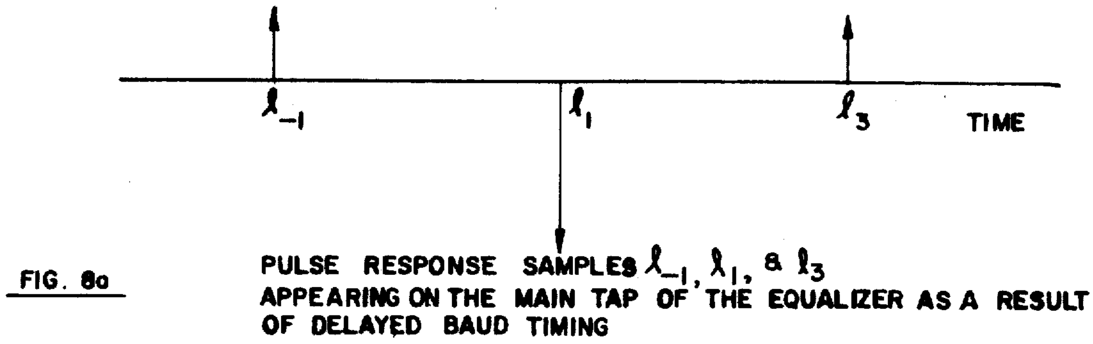
FIGS. 8*a* through 8*d* illustrate pulse samples, corrections and errors in equalizer outputs.
Figure 8B:
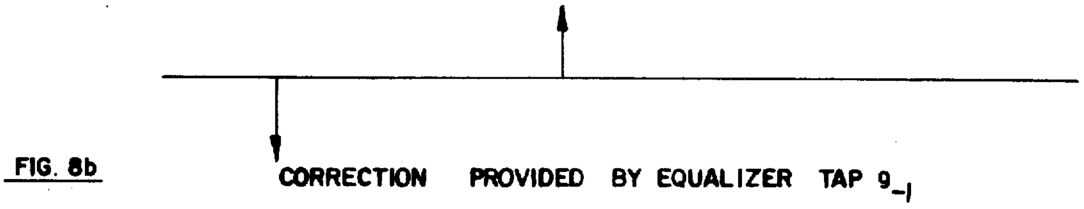
Figure 8C:
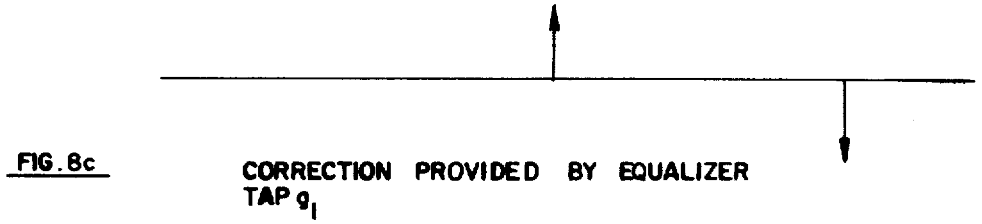
Figure 8D:
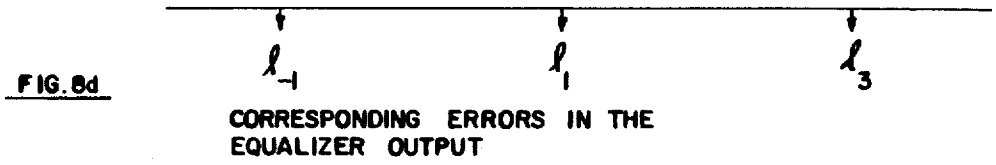

FIGS. 8a to 8d illustrate the action of equalizer taps $g_{-1}$ and $g_1$ in correcting the errors caused by the delayed sample timing. FIGS. 8a to 8d do not accurately show all of the effects of delayed sample (or baud) timing or the effects of all equalizer taps in correcting these effects; but, these figures illustrate the reasons $g_1 - g_{-1}$ can be used to control the baud timing. FIG. 8a is obtained from FIG. 7 and illustrates the samples $l_{-1}$, $l_1$ and $l_3$ appearing on the main equalizer tap (or with no equalizer adaptation to the timing error) as a result of the timing error. Equalizer tap $g_{-1}$ provides an echo of the system pulse response multiplied by $g_{-1}$ and advanced in time by one baud time. Since the main samples of the pulse response are $l_o$ and $l_2$, the main samples of this echo are those shown in FIG. 8b. This equalizer tap-gain is automatically adjusted to drive $l_1 - l_{-1}$ towards zero and therefore assumes a negative value to provide the negative echo samples shown in FIG. 8b. Similarly, the tap-gain $g_1$ goes positive to provide the correction shown in FIG. 8c. FIG. 8d shows the approximate results of combined action of the two equalizer tap-gain adjustments. The main fact to note here is that the delayed timing causes $g_1 - g_{-1}$ to go positive. Therefore, when $g_1 - g_{-1}$ goes positive, the baud timing should be advanced. The same general approach to fine timing correction can be applied to other types of signaling. For example, considering data transmission by conventional signaling, not partial responses.

Figure 9A:
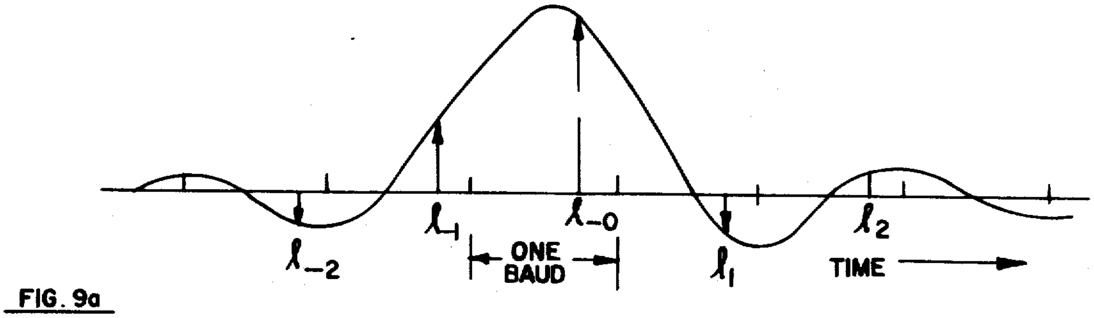
FIGS. 9*a* through 9*c* illustrate samples of a typical system pulse response with sample timing erroneously delayed and the corrections applied thereto.
Figure 9B:
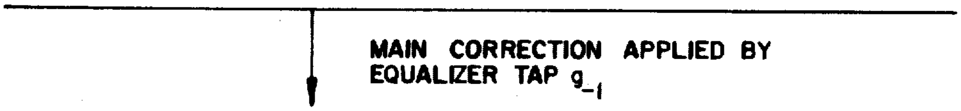
Figure 9C:

FIGS. 9a to 9c show a typical, equalized system pulse response. With delayed sample timing, the samples are as illustrated in FIG. 9a; whereas with correct timing $l_o$ falls at the peak of the pulse response and all other amplitude samples are ideally zero. As illustrated by FIG. 9b, delayed sample timing causes $g_1 - g_{-1}$ to go positive. The sample timing should be advanced when $g_1 - g_{-1}$ is positive and should be retarded when $g_1 - g_{-1}$ is negative. In a similar manner, we can use any one of several functions of the $g$'s to control the baud sample timing in conventional signaling applications.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as may fall within the true scope of the invention.

I claim:

1. In combination with an adaptive transversal equalizer having a plurally tapped delay line, with adjustable attenuators (or gains) connected to each delay line tap with one main tap for a major signal component and a summation circuit for combining the attenuated outputs of taps into a single coordinated signal, a fine timing recovery system comprising in combination:
   a. a difference means for taking the difference between tap gains located on either side of said main signal tap and for providing a difference signal proportional to said difference;
   b. a stable clock means for providing a train of pulses having a frequency greater than the needed baud timing rate;
   c. an ADD/DELETE means receiving the pulse train from said stable clock and the difference signal from said difference means for adding or deleting pulses from said pulse train in response to said difference signal; and
   d. frequency divider means for dividing the frequency of said pulse train down to the baud rate so as to provide an output pulse train which is timed to the received data signal.

2. The invention according to claim 1 and further comprising a frequency divider means receiving the pulse train from said stable clock means for dividing the frequency of said pulse train down to a frequency which is greater than said baud rate which signal is fed to said ADD/DELETE means.

3. The invention according to claim 1 wherein said difference means takes the difference between even placed tap gains with respect to the main tap.

4. The invention according to claim 1 wherein said difference means takes the difference between odd placed tap gains with respect to the main taps.

5. In combination with an adaptive transversal equalizer having a plurally tapped delay line, with adjustable attenuators (or gains) connected to each delay line tap with one main tap for a major signal component and a summation circuit for combining the attenuated outputs of taps into a single coordinated signal, a fine timing recovery system comprising in combination:
   a. a difference means for taking the difference between tap gains located on either side of said main signal tap and for providing a difference signal proportional to said difference
   b. a stable clock means for providing a train of pulses having a frequency greater than the needed baud timing rate;
   c. a first frequency divider means for receiving the pulse train from said clock means and for dividing the frequency of said pulse train to a value still greater than the baud signal rate;
   d. an adjustable frequency divider means for dividing said pulse train from said first frequency divider means by a fixed amount $n$ upon receipt of a first control signal, and by $n+1$ upon receipt of a second control signal, and by $n-1$ upon receipt of a third control signal, where the integer 1 corresponds to a pulse in said pulse train;

e. a threshold detector means for receiving said difference signal and for providing said first control signal when said difference falls between an upper and a lower threshold, and said second control signal when said difference signal is above the upper threshold level, and a third control signal when said difference signal is below the lower threshold level; and f. second frequency divider means receiving the output signal from said adjustable frequency divider means for dividing said signal down to the baud transmission rate.

6. The invention according to claim 5 wherein said summation means takes the difference between symmetrically positioned tap gains with respect to the main tap.

7. The invention according to claim 5 wherein said summation means takes the difference between even placed tap gains with respect to the main tap.

8. The invention according to claim 5 wherein said summation means takes the difference between odd placed tap gains with respect to the main tap.

9. In combination with an adaptive transversal equalizer having a plurally tapped delay line, with adjustable attenuators (or gains) connected to each delay line tap with one main tap for a major signal component and a summation circuit for combining the attenuated outputs of taps into a single coordinated signal, a fine timing recovery system comprising in combination:

a. a summation means for summing the signal difference between the tap gains located on either side of said major signal tap, for providing a difference signal proportional to said difference;

b. a stable clock means for providing a train of pulses having a frequency greater than the baud rate of transmission;

c. a first frequency divider means for receiving the pulse train from said clock means and for dividing the frequency of said pulse train to a value still greater than the baud signal rate;

d. a pulse ADD/DELETE means responsive to the signal from said summation means for adding or deleting pulses proportional to the magnitude and sign of said difference signal; and e. a second frequency divider means for receiving the output of said ADD/DELETE means and for dividing said output down to the baud transmission rate.

10. The invention according to claim 9 wherein said summation means takes the difference in gains between symmetrically positioned taps with respect to the main tap.

11. The invention according to claim 9 wherein said summation means takes the difference in gains between even placed taps with respect to the main tap.

12. The invention according to claim 9 wherein said summation means takes the difference in gains between odd placed taps with respect to the main tap.

13. In combination with an adaptive transversal equalizer having a plurally tapped delay line, with adjustable attenuators (or gains) connected to each delay line tap with one main tap for a major signal component and a summation circuit for combining the attenuated outputs of taps into a single coordinated signal, a fine timing recovery system comprising in combination:

a. a summation means for summing the gain difference between the taps located on either side of said main signal tap, for providing a difference signal proportional to said difference;

b. a stable clock means for providing a train of pulses having a frequency greater than the baud signal received by the transversal equalizer;

c. a first frequency divider means for receiving the pulse train from said clock means and for dividing the frequency of said pulse train to a value still greater than the baud signal rate;

d. filter means for receiving the pulse train from said first frequency divider means and for converting said pulse train into a sine wave signal of identical frequency;

e. a digital-to-analog converter means for converting the output of the summation device into a proportional analog signal;

f. phase modulator means for receiving the sine wave signal from said filter means and for receiving the proportional analog signal from said digital to analog converter so as to modulate said sine wave signal as a function of said proportional analog signal;

g. means for converting the modulated sine wave signal from said phase modulator means into a pulse train signal having a frequency and phase corresponding to the frequency and phase of said sine wave signal; and h. a second frequency divider means for receiving the pulse train signal from said converter means and for dividing the frequency of said signal down to said baud rate.

14. The fine timing recovery system according to claim 13 wherein said converter means is further comprised of:

a. an amplifier for amplifying said modulated sine wave signal;

b. a limiter for converting the amplified sine wave signal into a square wave signal of proportional frequency; and c. a differentiator for differentiating said square wave signal so as to provide a pulse train signal of proportional frequency to said second frequency divider means.

15. The invention according to claim 13 wherein said summation means takes the difference in gain between symmetrically positioned taps with respect to the main located tap.

16. The invention according to claim 13 wherein said summation means takes the difference in gain between even placed taps with respect to the main tap.

17. The invention according to claim 13 wherein said summation means takes the difference in gain between odd placed taps with respect to the main tap.

* * * * *